US012734389B2

(12) United States Patent
Fan

(10) Patent No.: US 12,734,389 B2
(45) Date of Patent: Sep. 15, 2026

(54) GEL COMPOSITION

(71) Applicant: FLAME SECURITY INTERNATIONAL PTY LTD., Kensington (AU)

(72) Inventor: Ka Wai Fan, Kensington (AU)

(73) Assignee: Flame Security International Pty Ltd, Kensington (AU)

( * ) Notice: Subject to any disclaimer, the term of this patent is extended or adjusted under 35 U.S.C. 154(b) by 0 days.

(21) Appl. No.: 19/063,920

(22) Filed: Feb. 26, 2025

(65) Prior Publication Data

US 2025/0195931 A1 Jun. 19, 2025

Related U.S. Application Data

(63) Continuation of application No. PCT/AU2023/050843, filed on Aug. 31, 2023.

(30) Foreign Application Priority Data

Sep. 2, 2022 (AU) ................................ 2022902526

(51) Int. Cl.
*A62D 1/00* (2006.01)

(52) U.S. Cl.
CPC .................................. *A62D 1/0064* (2013.01)

(58) Field of Classification Search
None
See application file for complete search history.

(56) References Cited

U.S. PATENT DOCUMENTS

| | | | | |
|---|---|---|---|---|
| 10,131,800 | B2 | 11/2018 | Kittle et al. | |
| 2005/0029499 | A1 | 2/2005 | Kasowski et al. | |
| 2012/0298906 | A1 | 11/2012 | Kostova | |
| 2016/0032191 | A1 | 2/2016 | Carlson et al. | |
| 2020/0368570 | A1 * | 11/2020 | Hodgen | A62D 1/0064 |
| 2022/0241635 | A1 * | 8/2022 | Hodgen | A62D 1/0064 |

FOREIGN PATENT DOCUMENTS

| | | | | |
|---|---|---|---|---|
| CA | 2075655 | A1 * | 2/1993 | |
| WO | WO-2015134856 | A1 * | 9/2015 | A62D 1/0064 |

OTHER PUBLICATIONS

International Application No. PCT/AU2023/050843, International Search Report and Written Opinion mailed on Sep. 25, 2023, 10 pages.

* cited by examiner

*Primary Examiner* — Tanisha Diggs
(74) *Attorney, Agent, or Firm* — Kilpatrick Townsend & Stockton LLP

(57) ABSTRACT

Flame retardant gel compositions containing nitrogen-containing blowing agents, phosphorus-containing acids, and compounds to promote the formation of insulating chars are provided. When applied to a substrate, the gels are useful in the reduction and containment of fire.

20 Claims, 8 Drawing Sheets

GEL COMPOSITION

CROSS-REFERENCE TO RELATED APPLICATIONS

This application claims priority to PCT/AU2023/050843, filed Aug. 31, 2023, which application claims priority to AU2022902526, filed Sep. 2, 2022, the contents both of which are hereby incorporated by reference in their entireties for all purposes.

FIELD OF THE DISCLOSURE

The present disclosure relates to flame retardant gel compositions containing nitrogen-containing blowing agents, phosphorus-containing acids, and compounds to promote the formation of insulating chars. When applied to a substrate, the gels are useful in the reduction and containment of fire.

BACKGROUND OF THE DISCLOSURE

Incidents involving fire cause severe damage to the environment, structures, wildlife and can cause the loss of life. Fire incidents can be man-made but also occur naturally through events such as wildfires. The damage caused by large wildfires is devastating for people, businesses and the local environment.

Fire retardants are used to slow the spread or reduce the intensity of a fire. They help fire fighters and others to mitigate, control or reduce the damage caused by fire incidents. Fire retardants typically consist of detergent chemicals made from a combination of wetting agents, foaming chemicals, fertilisers mixed with thickeners and corrosion inhibitors. They are mixed with water to form a foam, gel or slurry and applied to the area of concern either prior or during a fire incident.

Fire retardant gels act by either blocking the fire physically or by initiating a chemical reaction that stops the fire.

Physical action of fire retardants includes cooling the material through a chemical reaction, forming a protective layer that prevents the underlying material from igniting and diluting the flame through the release of water and/or carbon dioxide while burning.

Chemical action of fire retardants includes interruption of reactions in the gas phase using organic halides (although these are often toxic and mostly restricted), reactions in the solid phase, formation of a char layer which is harder to burn and prevents further damage, and the use of intumescent materials incorporating chemicals which cause swelling behind a protective char layer, providing a layer of insulation to reduce burning and damage.

Most fire retardant gels on the market are based on superabsorbent polymer technology. The polymer gels are able to absorb hundreds of times their weight in water resulting in a "bubblet" surrounded by a polymer shell. The bubblets stack one on top of another during application and provide a thermal protective blanket over the surface to which the gel is applied. Due to the high specific heat of water, the bubblets are able to absorb much of the heat given off by the fire, therefore slowing the fires progress. However, after the retained water is completely evaporated from the gel, fire resistance is lost.

Since fire retardant gel compositions are released to the environment, it is desirable to formulate them so that they have low toxicity and are biodegradable to avoid damage to the environment and ecosystem.

In view of the increasing number and intensity of fire incidents, there is a need for alternative fire retardant gel compositions. In particular, fire retardant gels that maintain long term fire resistance.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

In one aspect the present disclosure provides a fire retardant gel composition, said composition comprising:

a) from about 5 wt. % to about 30 wt. % of one or more basic nitrogen-containing blowing agents,
b) from about 1 wt. % to about 15 wt. % of one or more phosphorus-containing acids;
c) from about 1 wt. % to about 5 wt. % of one or more humectants;
d) from about 0.1 wt. % to about 1 wt. % of one or more thixotropes;
e) from about 1 wt. % to about 10 wt. % of one or more char expansion promoters; and the balance being water to 100 wt. %.

In embodiments, the basic nitrogen-containing blowing agents comprise one or more of ammonia, urea, ethanolamine, diethanolamine, triethanolamine, triethylamine, aminomethyl propanol and tris(hydroxymethyl)-aminomethane.

In embodiments, the phosphorus-containing acids comprise one or more of polyphosphoric acid or phosphoric acid.

In embodiments, the humectants comprise one or more polyols. Preferably, the humectants comprise one or more of glycerol, diethylene glycol, propylene glycol, sorbitol, butylene glycol, polyethylene glycol, panthenol and sodium pyrrolidone carboxylic acid. More preferably, the humectant comprises one or more of glycerol, propylene glycol, sorbitol, polyethylene glycol, panthenol and sodium pyrrolidone carboxylic acid. In particular embodiments, the humectant comprises glycerol or propylene glycol.

In embodiments, the char expansion promoters comprise from one or more of lignin, tannic acid, lignosulfonate salts, or other polyphenols. Preferably, the char expansion promoters comprise lignin and lignosulfonate salts.

In embodiments, the lignosulfonate salts comprise one or more of alkali metal or alkaline earth metal lignosulfonates. Preferably sodium lignosulfonate or calcium lignosulfonate. In a particular embodiment the lignosulfonate salt comprises calcium lignosulfonate.

In embodiments, the thixotrope comprises one or more of xanthan gum, diutan gum, starch, carboxymethyl cellulose, methyl cellulose, hydroxypropylmethyl cellulose, hydroxyethylcellulose, sclerotium gum, agar, pectin and alginates. More preferably, the thixotrope comprises one or more of xanthan gum or diutan gum. In a preferred embodiment the thixotrope comprises xanthan gum.

In embodiments, the gel composition comprises:

a) from about 5 wt. % to about 30 wt. % of one or more basic nitrogen-containing blowing agents;
b) from about 1 wt. % to about 15 wt. % of one or more phosphorus-containing acids;
c) from about 1 wt. % to about 5 wt. % of one or more humectants;
d) from about 0.1 wt. % to about 1 wt. % of one or more thixotropes;

e) from about 1 wt. % to about 10 wt. % of one or more char expansion promoters and the balance being water to 100 wt. %.

In embodiments, the gel composition comprises:

a) from about 5 wt. % to about 30 wt. % of tris(hydroxymethyl)-aminomethane;

b) from about 1 wt. % to about 15 wt. % of polyphosphoric acid;

c) from about 1 wt. % to about 5 wt. % of glycerol or propylene glycol;

d) from about 0.1 wt. % to about 1 wt. % of xanthan gum or diutan gum;

e) from about 1 wt. % to about 10 wt. % of one or more of lignin or lignosulfonate salts; and the balance being water to 100 wt. %.

In embodiments, the gel composition comprises:

a) from about 5 wt. % to about 30 wt. % of tris(hydroxymethyl)-aminomethane;

b) from about 1 wt. % to about 15 wt. % of polyphosphoric acid;

c) from about 1 wt. % to about 5 wt. % of glycerol or propylene glycol;

d) from about 0.1 wt. % to about 1 wt. % of xanthan gum or diutan gum;

e) from about 1 wt. % to about 10 wt. % of one or more of lignin or calcium lignosulfonate; and the balance being water to 100 wt. %.

In embodiments, the gel composition comprises:

a) from about 10 wt. % to about 20 wt. % of tris (hydroxymethyl)-aminomethane;

b) from about 3 wt. % to about 8 wt. % of polyphosphoric acid;

c) from about 2 wt. % to about 4 wt. % of glycerol or propylene glycol;

d) from about 0.1 wt. % to about 0.5 wt. % of xanthan gum or diutan gum;

e) from about 1 wt. % to about 10 wt. % of one or more of lignin or calcium lignosulfonate; and the balance being water to 100 wt. %.

In embodiments, the gel composition comprises:

a) from about 10 wt. % to about 20 wt. % of tris (hydroxymethyl)-aminomethane;

b) from about 3 wt. % to about 8 wt. % of polyphosphoric acid;

c) from about 2 wt. % to about 4 wt. % of glycerol or propylene glycol;

d) from about 0.1 wt. % to about 0.5 wt. % of xanthan gum or diutan gum;

e) from about 1 wt. % to about 10 wt. % of lignin; and the balance being water to 100 wt. %.

In embodiments, the gel composition comprises:

a) from about 10 wt. % to about 20 wt. % of tris (hydroxymethyl)-aminomethane;

b) from about 3 wt. % to about 8 wt. % of polyphosphoric acid;

c) from about 2 wt. % to about 4 wt. % of glycerol or propylene glycol;

d) from about 0.1 wt. % to about 0.5 wt. % of xanthan gum or diutan gum;

e) from about 1 wt. % to about 10 wt. % of calcium lignosulfonate; and the balance being water to 100 wt. %.

In embodiments, the gel composition further comprises one or more auxiliaries selected from anticorrosion agents, surfactants, preservatives, and biocides.

In embodiments, the gel composition has a viscosity between about 90 mPa/s and about 420 mPa/s at 20° C.

In embodiments, the gel composition exhibits thixotropic behaviour.

In another aspect, the present disclosure provides the use of the gel composition according to any one of the herein disclosed embodiments as a fire-retardant.

In another aspect, the present disclosure provides a method of protecting a substrate from fire, comprising the step of applying the gel composition according to any one of the herein disclosed embodiments to the substrate.

In embodiments, the method comprises applying the gel composition in an amount from about 100 to about 700 $mL/m^2$.

In embodiments, the method reduces the progression of, or severity of damage caused by, fire to the substrate.

In another aspect, there is provided a coated substrate comprising a substrate; and a coating comprising the gel composition according to any one of the herein disclosed embodiments.

In embodiments, the gel composition is present on the substrate in an amount from about 100 $mL/m^2$ to about 700 $mL/m^2$.

In another aspect, the present disclosure provides a coated substrate comprising a substrate and a coating comprising a gel composition, said gel composition comprising:

a) from about 5 wt. % to about 60 wt. % of one or more basic nitrogen-containing blowing agents;

b) from about 1 wt. % to about 30 wt. % of one or more phosphorus containing acids;

c) from about 1 wt. % to about 10 wt. % of one or more humectants;

d) from about 0.1 wt. % to about 2 wt. % of one or more thixotropes;

e) from about 1 wt. % to about 10 wt. % of one or more char expansion promoters; and f) the balance being water in an amount between about 5 wt. % to about 72 wt. %.

In embodiments, the water content is from about 5 wt. % to about 60 wt. %.

In embodiments, the water content is from about 5 wt. % to about 40 wt. %.

In embodiments, the water content is from about 5 wt. % to about 20 wt. %.

In embodiments, the substrate is metal, wood, glass or plastic.

In embodiments, the sum of the nitrogen-containing blowing agents, phosphorus-containing acids, thixotropes, humectants, char expansion promotors, and auxiliaries (if present), in the coating is from about 50 to about 250 $g/m^2$.

In embodiments, the sum of the nitrogen-containing blowing agents, phosphorus-containing acids, thixotropes, humectants, char expansion promotors, and auxiliaries (if present), in the coating is from about 75 to about 200 $g/m^2$.

In embodiments, the sum of the nitrogen-containing blowing agents, phosphorus-containing acids, thixotropes, humectants, char expansion promotors, and auxiliaries (if present), in the coating is from about 125 to about 175 $g/m^2$ In another aspect, the present disclosure provides a method of manufacturing the gel composition by combining the nitrogen-containing blowing agent, the phosphorus-containing acid, the humectant, the thixotrope, the char expansion promoter and water.

In embodiments, the method comprises the steps of:

a) combining the phosphorus-containing acids and the basic nitrogen-containing blowing agent in water;

b) adding the char expansion promoter;

c) adding the thixotrope and humectant so that the gel composition is formed.

In another aspect, the present disclosure provides the gel composition according to any one of the herein disclosed embodiments, characterised by being the product formed by any one of the methods as herein disclosed.

Advantages of the presently disclosed fire retardant gel compositions include one or more of the following:

- The gel compositions are ready-to-use flame retardants that form an intumescent coating instantly on targeted substrates.
- The gel compositions may contain one or more components that are bio-derived, are low in toxicity and biodegradable, which minimises the impact on the environment and the ecosystem.
- The gel composition coating expands on heating to form a char layer, which serves as an insulating non-combustible layer to dissipate heat and flame propagation.
- The viscoelastic nature of the gel compositions allows it to retain on inclined and vertical surfaces.
- The gel composition coating bonds well with the substrate and remains effective even when the water content is reduced through evaporation, providing long term flame protection.
- The gel composition can be removed easily, which is beneficial to equipment upkeep.

Any embodiment herein shall be taken to apply mutatis mutandis to any other embodiment unless specifically stated otherwise.

The present disclosure is not to be limited in scope by the specific embodiments described herein, which are intended for the purpose of exemplification only. Functionally-equivalent products, compositions and processes are clearly within the scope of the disclosure as described herein.

Further aspects of the present disclosure and further embodiments of the aspects described in the preceding paragraphs will become apparent from the following description, given by way of example and with reference to the accompanying drawings.

DETAILED DESCRIPTION OF THE EMBODIMENTS

Figure 1:
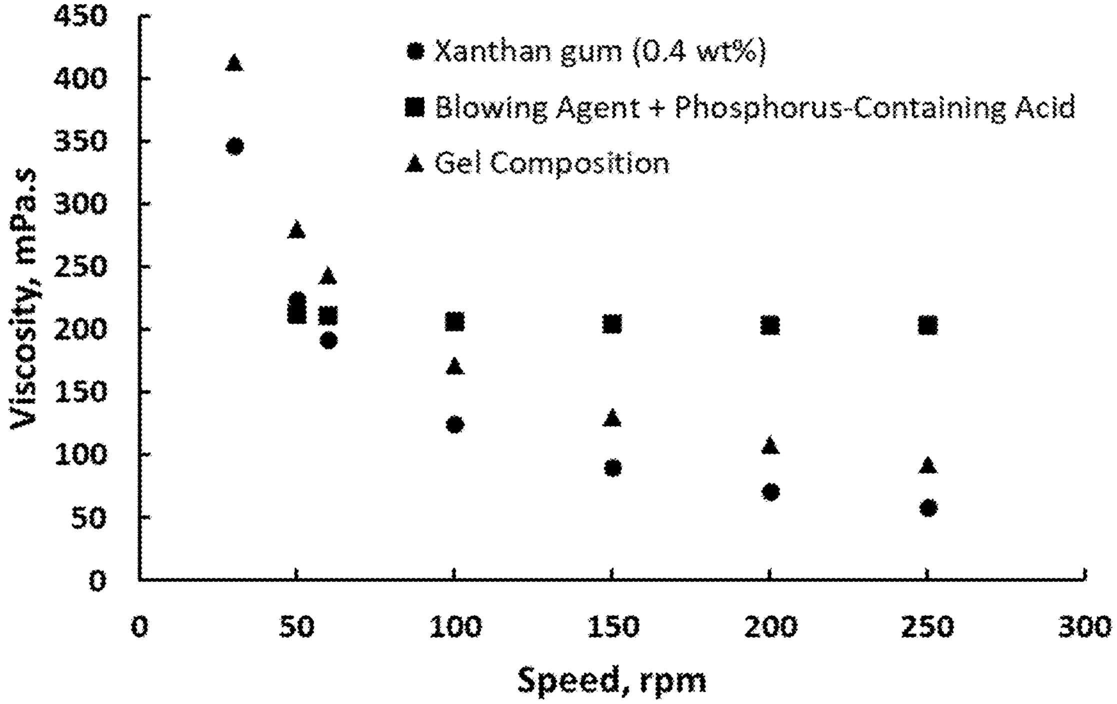
FIG. 1. Plot of viscosity (mPa/s) against speed (rpm) of a 0.4 wt. % xanthan gum solution, a solution of fire retardant (containing the nitrogen-containing blowing agent and phosphorus-containing acid) and gel composition 3.

It will be understood that the disclosure described and defined in this specification extends to all alternative combinations of two or more of the individual features mentioned or evident from the text or drawings. All of these different combinations constitute various alternative aspects of the disclosure.

Definitions

For purposes of interpreting this specification, terms used in the singular will also include the plural and vice versa.

As used herein, except where the context requires otherwise, the term "comprise" and variations of the term, such as "comprising", "comprises" and "comprised", are not intended to exclude further additives, components, integers or steps.

"About" as used herein when referring to a measurable value such as an amount, a temporal duration, and the like, is meant to encompass variations of ±20% or ±10%, in some instances ±5%, in some instances ±1%, and in some instances ±0.1% from the specified value, as such variations are appropriate to perform the disclosed methods.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The present disclosure relates to flame retardant gel compositions comprising basic nitrogen-containing blowing agents, phosphorus-containing acids, humectants, thixotropes and char expansion promotors. When combined, they form flame retardant gel compositions which, when applied to, for example, wood, are useful in the containment of fire.

The present disclosure provides a flame retardant gel composition comprising:

a) from about 5 wt. % to about 30 wt. % of one or more basic nitrogen-containing blowing agents;

b) from about 1 wt. % to about 15 wt. % of one or more phosphorus containing acids;
c) from about 1 wt. % to about 5 wt. % of one or more humectants;
d) from about 0.1 wt. % to about 1 wt. % of one or more thixotropes;
e) from about 1 wt. % to about 10 wt. % of one or more char expansion promoters, and the balance being water to 100 wt. %.

The gel composition is able to be stored and easily applied to a substrate through, for example, spreading or spraying the gel composition.

Basic Nitrogen-Containing Blowing Agents

Basic nitrogen-containing blowing agents include one or more of ammonia, ethanolamine, diethanolamine, triethanolamine, triethylamine, aminomethyl propanol and tris (hydroxymethyl)-aminomethane.

The amount of basic nitrogen containing blowing agent in the flame retardant gel composition may be between about 5 wt. % and about 30 wt. %, or between about 10 wt. % and about 30 wt. %, or between about 15 wt. % and about 30 wt. %, or between about 20 wt. % and about 30 wt. %, or between about 25 wt. % and about 30 wt. %, or between about 5 wt. % and about 25 wt. %, or between about 10 wt. % and about 25 wt. %, or between about 15 wt. % and about 25 wt. %, or between about 20 wt. % and about 25 wt. %, or between about 5 wt. % and about 20 wt. %, or between about 10 wt. % and about 20 wt. %, or between about 15 wt. % and about 20 wt. % based on the total weight of the flame retardant gel composition.

In embodiments, the amount of basic nitrogen-containing blowing agent in the flame retardant gel composition is about 5 wt. %, or about 6 wt. %, or about 7 wt. %, or about 8 wt. %, or about 9 wt. %, or about 10 wt. %, or about 11 wt. %, or about 12 wt. %, or about 13 wt. %, or about 14 wt. %, or about 15 wt. %, or about 16 wt. %, or about 17 wt. %, or about 18 wt. %, or about 19 wt. %, or about 20 wt. %, or about 21 wt. %, or about 22 wt. %, or about 23 wt. %, or about 24 wt. %, or about 25 wt. %, or about 26 wt. %, or about 27 wt. %, or about 28 wt. %, or about 29 wt. %, or about 30 wt. %.

Preferred basic nitrogen-containing blowing agents include tris(hydroxymethyl)-aminomethane.

Phosphorus-Containing Acids

Phosphorus-containing acids includes one or more of phosphoric acid, polyphosphoric acid (115% basis), polyphosphoric acid (117% basis), polyphosphoric acid (105% basis) and polyphosphoric acid (95% basis).

The amount of phosphorous-containing acids in the flame retardant gel composition may be between about 1 wt. % and about 15 wt. %, or between about 3 wt. % to 15 wt. %, or between about 5 wt. % to about 15 wt. %, or between about 8 wt. % to about 15 wt. %, or between about 10 wt. % to about 15 wt. %, or between about 12 wt. % to about 15 wt. %, or between about 1 wt. % to 12 wt. %, or between about 3 wt. % to about 12 wt. %, or between about 5 wt. % to about 12 wt. %, or between about 8 wt. % to about 12 wt. %, or between about 10 wt. % to about 12 wt. %, or between about 1 wt. % to about 10 wt. %, or between about 3 wt. % to about 10 wt. %, or between about 5 wt. % to about 10 wt. %, or between about 8 wt. % to about 10 wt. %, or between about 1 wt. % to about 8 wt. %, or between about 3 wt. % to about 8 wt. %, or between about 5 wt. % to about 8 wt. %, or between about 1 wt. % to about 5 wt. %, or between about 3 wt. % to about 5 wt. %, or between about 1 wt. % to 3 wt. % based on the total weight of the flame retardant gel composition.

In embodiments, the amount of phosphorus-containing acids in the flame retardant gel composition is about 1 wt. %, or about 1.5 wt. %, or about 2 wt. %, or about 2.5 wt. %, or about 3 wt. %, or about 3.5 wt. %, or about 4 wt. %, or about 4.5 wt. %, or about 5 wt. %, or about 5.5 wt. %, or about 6 wt. %, or about 6.5 wt. %, or about 7 wt. %, or about 7.5 wt. %, or about 8 wt. %, or about 8.5 wt. %, or about 9 wt. %, or about 9.5 wt. %, or about 10 wt. %, or about 10.5 wt. %, or about 11 wt. %, or about 11.5 wt. %, or about 12 wt. %, or about 12.5 wt. %, or about 13 wt. %, or about 13.5 wt. %, or about 14 wt. %, or about 14.5 wt. %, or about 15 wt. %.

Humectants

Humectants may include one or more polyols, wherein a polyol is an organic compound containing multiple hydroxyl (—OH) groups.

Suitable humectants include glycerol, diethylene glycol, propylene glycol, sorbitol, butylene glycol, polyethylene glycol, panthenol and sodium pyrrolidone carboxylic acid. Other humectants known in the art are contemplated.

Preferred humectants include glycerol and propylene glycol.

The amount of humectant in the flame retardant gel composition may be between about 1 wt. % to about 5 wt. %, or between about 2 wt. % to about 4 wt. %, based on the total weight of the flame retardant gel composition.

In embodiments, the amount of humectant in the flame retardant gel composition is about 1 wt. %, or about 1.5 wt. %, or about 2 wt. %, or about 2.5 wt. %, or about 3 wt. %, or about 3.5 wt. %, or about 4 wt. %, or about 4.5 wt. %, or about 5 wt. %.

Thixotropes

Thixotropes include one or more of xanthan gum, diutan gum, starch, carboxymethyl cellulose, methyl cellulose, hydroxypropylmethyl cellulose, hydroxyethylcellulose, sclerotium gum, agar, pectin and alginates. Other thixotropes known in the art are contemplated.

Preferred thixotropes include xanthan gum and diutan gum.

The amount of thixotrope in the flame retardant gel composition may be between about 0.1 wt. % to about 1 wt. %, or between about 0.1 wt. % to about 0.5 wt. %, based on the total weight of the flame retardant gel composition.

In embodiments, the amount of thixotropes in the flame retardant gel composition is about 0.1 wt. %, or about 0.2 wt. %, or about 0.3 wt. %, or about 0.4 wt. %, or about 0.5 wt. %, or about 0.6 wt. %, or about 0.7 wt. %, or about 0.8 wt. %, or about 0.9 wt. %, or about 1 wt. %.

Char Expansion Promotors

Char expansion promotors include one or more of lignin, tannic acid, lignosulfonate salts, or other polyphenols.

Lignosulfonate salts preferably include alkali metal or alkalne earth metal salts, which include lithium lignosulfonate, sodium lignosulfonate, potassium lignosulfonate, rubidium lignosulfonate, cesium lignosulfonate, beryllium lignosulfonate, magnesium lignosulfonate, calcium lignosulfonate, strontium lignosulfonate and barium lignosulfonate.

Preferred char expansion promotors include lignin, sodium lignosulfonate and calcium lignosulfonate.

The amount of char expansion promotor in the flame retardant gel composition may be between about 1 wt. % to about 10 wt. %, or about 1 wt. % to about 5 wt. %.

In embodiments, the amount of char expansion promotor in the flame retardant gel composition is about 1 wt. %, or about 1.5 wt. %, or about 2 wt. %, or about 2.5 wt. %, or about 3 wt. %, or about 3.5 wt. %, or about 4 wt. %, or about 4.5 wt. %, or about 5 wt. %, or about 5.5 wt. %, or about 6 wt. %, or about 6.5 wt. %, or about 7 wt. %, or about 7.5 wt. %, or about 8 wt. %, or about 8.5 wt. %, or about 9 wt. %, or about 9.5 wt. %, or about 10 wt. %.

Water

When the flame retardant gel composition is applied to a substrate, the amount of water may be between about 5 wt. % and about 72 wt. %, or between 5 wt. % and about 60 wt. %, or between about 5 wt. % and about 40 wt. %, or between about 5 wt. % and about 20 wt. %.

Other Components

In embodiments, the flame retardant gel composition further comprises one or more auxiliaries selected from anticorrosion agents, surfactants, preservatives, and biocides.

Suitable anticorrosion agents include, for example, sodium benzoate and benzotriazole. Other anticorrosion agents known in the art are contemplated.

The amount of anticorrosion agents present in the flame retardant gel composition is typically less than about 1 wt. % based on the total weight of the flame retardant gel composition.

Suitable surfactants include, for example, coco glycocide. Other surfactants known in the art are contemplated.

The amount of surfactant present in the flame retardant gel composition is typically less than about 3 wt. % based on the total weight of the flame retardant gel composition.

Suitable preservatives include, for example, biocides such as Acticide® MBS. Other preservatives known in the art are contemplated.

The amount of preservatives present in the flame retardant gel composition is typically less than about 1 wt. % based on the total weight of the flame retardant gel composition.

Flame Retardant Gel Compositions

The flame retardant gel compositions of the present disclosure have a number of useful properties, including viscoelastic, sprayability and stability properties.

The flame retardant gel compositions are stable over time. For example, removal of water from the gel composition over time still provides good fire protection.

In embodiments, the flame retardant gel composition has a viscosity between about 90 mPa/s and about 420 mPa/s at 20° C.

In embodiments, the flame retardant composition exhibits thixotropic behaviour.

A key feature of the flame retardant gel compositions of the present disclosure is their ability to be easily applied to a substrate to form a flame retardant coating.

Another key feature of the flame retardant gel compositions of the present disclosure is their ability to form a protective char layer to insulate a substrate from fire upon contacting the gel composition with a flame.

Furthermore, after application of the flame retardant gel composition onto a substrate, for example, wood, the viscoelastic properties are such that the gel composition clings to the substrate, thus improving coverage of the flame retarding components.

Preparation of the Flame Retardant Gel Compositions

The flame retardant gel compositions may be simply prepared by combining the nitrogen-containing blowing agent, the phosphorus-containing acid, the humectant, the thixotrope, the char expansion promoter, and water.

In embodiments, the fire retardant gel compositions may also be prepared by the following:

a) combining the phosphorus-containing acid and the basic nitrogen-blowing agent in water;
b) adding the char expansion promoter;
c) adding the thixotrope and humectant so that the gel composition is formed.

Use of the Flame Retardant Gel Compositions

The flame retardant gel compositions of the present disclosure are primarily, but not exclusively, targeted for use in forming a coating on a substrate that will stop or reduce the likelihood of a fire spreading and/or damage caused to the substrate.

The flame retardant gel compositions may be applied to a substrate in an amount greater than 100 mL/m$^2$, or greater than 150 mL/m$^2$, or greater than 200 mL/m$^2$ or greater than 250 mL/m$^2$, or greater than 300 mL/m$^2$, or greater than 350 mL/m$^2$, or greater than 400 mL/m$^2$, Useful coverage for forming a coating may be between about 100 mL/m$^2$ to about 700 mL/m$^2$, or from about 200 mL/m$^2$ to about 700 mL/m$^2$, or from about 300 mL/m$^2$ to about 600 mL/m$^2$, or from about 400 mL/m$^2$ to about 600 mL/m$^2$.

Other uses of the flame retardant gel compositions of the present disclosure in preventing or reducing the spread of fire are contemplated.

EXAMPLES

Materials

Ethanolamine polyphosphate, diammonium phosphate (DAP), tris(hydroxymethyl)aminomethane, aminomethyl propanol, polyphosphoric acid (115% basis), polyphosphoric acid (117% basis), polyphosphoric acid (105% basis), polyphosphoric acid (95% basis), glycerol, propylene glycol, coco glycoside, xanthan gum, diutan gum, sodium benzoate, benzotriazole, calcium lignosulfonate and lignin were purchased from commercially available suppliers.

Pine wood boards (premium dressed, 140 mm×19 mm×1.2 m, Claymark) were purchased from commercially available suppliers and cut into 100 mm×19 mm×100 mm panels for sample preparation.

Smaller offcuts (ca. 100 mm×19 mm×35 mm) were used in small-scale burn studies.

Analytical Methods

Scanning electron microscopy (SEM) was performed using FEI Nova NanoSEM 450 with an accelerated voltage of 20 kV. Char samples were carefully retrieved to determine the correlation between performance and char structure due to the use of different performance additives. The sample surface was coated with Cr (5 nm) and Pt (10 nm) using LEICA ACE 600 sputter coater prior to imaging.

Raman spectroscopy was performed over the 2200 to 600 cm$^{-1}$ range using Renishaw inVia 2 Raman spectrometer with choices of wavelength at 532, 633, 785 and 830 nm. The results were used to determine the degree of graphitisation of the char layer based on the area ratio between the D band and G band, i.e., $I_D/I_G$.

Viscosity measurements were performed with ATAGO VISCO™-895 viscometer over a range of speed from 30 to 250 rpm (if applicable). Spindle A1 was used.

Fire Testing

Cone calorimetry was performed on 100 mm×19 mm×100 mm wood panels according to ISO 5660-1 using Fire Testing Technology cone calorimeter under an incident heat flux of 35 kW/m$^2$ and 50 kW/m$^2$.

Pre-cut wood panels were coated with the prepared gel compositions on the exposed surface at a coverage of 500 mL/m$^2$ using a syringe for all tests unless otherwise stated. A minimum of two samples were prepared for each gel formulation.

The coated samples were dried horizontally at 70° C. for 19.5 h using a Sunbeam Food Lab™ Electronic Dehydrator, and allowed to equilibrate at ambient conditions prior to testing.

For preliminary fire testing the prepared samples (from smaller offcuts) were positioned upright, and a butane torch flame (medium intensity) was applied perpendicularly towards the centre of the samples for 30 seconds, after which the torch was removed. Flame on the sample, if ignited, was allowed to self-extinguish in 10 seconds, beyond which the flame was blown out.

General Method for Preparing Gel Compositions

The components of the gel compositions can be combined to provide a fire retardant gel composition.

A solution of phosphorus-containing acid was gradually added to an agitated dispersion of basic nitrogen-containing blowing agent in water. The mixture was stirred continuously until it cooled down to ambient temperature. To this mixture, auxiliaries were optionally added. To a separate vessel, the thixotrope was added to the humectant and dispersed by stirring for 15 min. at 50° C. The aqueous mixture was then diluted and added to the dispersion quickly to promote hydration. The total mixture was kept stirring at 50° C. until the dispersion had been fully hydrated and the mixture formed a consistent gel. The gel was allowed to cool to ambient temperature. Biocides and preservatives were optionally added.

Example 1: Gel Compositions

Several gel compositions are shown in Table 1 based on the components listed in the materials section. Composition 1 was a control composition containing no char expansion promoter. Compositions 2 to 5 contained various amounts of char expansion promoter. Compositions were made up to 100 wt. % with water and the presence or absence of auxiliaries did not have a material effect on the fire performance of the gel composition.

TABLE 1

| Component | 1 | 2 | 3 | 4 | 5 |
|---|---|---|---|---|---|
| Basic Nitrogen-containing blowing agent wt. % | 10-20 | 10-20 | 10-20 | 10-20 | 10-20 |
| Phosphorus-containing acid wt. % | 3-8 | 3-8 | 3-8 | 3-8 | 3-8 |
| Humectant wt. % | 1-5 | 1-5 | 1-5 | 1-5 | 1-5 |
| Thixotrope wt. % | 0.1-1 | 0.1-1 | 0.1-1 | 0.1-1 | 0.1-1 |
| Char expansion promoters wt. % | 0 | 1 | 2 | 3 | 5 |
| Various auxiliaries wt. % | 0-5 | 0-5 | 0-5 | 0-5 | 0-5 |

Example 2: Viscosity Profile of the Gel Composition

The viscosity of gel composition 3 of Example 1, containing 2 wt. % calcium lignosulfonate as a char expansion promoter, was determined at various shear rates (Table 2).

TABLE 2

| | Viscosity, mPa/s | | |
|---|---|---|---|
| Speed, rpm | Xanthan gum (0.4 wt %) | Fire retardant concentrate | Gel composition 3 |
| 30 | 346 | N/A | 413 |
| 50 | 224 | 212 | 280 |
| 60 | 192 | 211 | 244 |
| 100 | 125 | 206 | 171 |
| 150 | 90 | 204 | 131 |
| 200 | 70 | 204 | 108 |
| 250 | 59 | 204 | 93 |

It was compared to a 0.4 wt. % aqueous solution of xanthan gum and a roughly 60% solution of fire retardant concentrate containing the nitrogen-containing blowing agent and phosphorus-containing acid. The results are shown in FIG. 1.

The data shows that the gel composition exhibits thixotropic behaviour, allowing it to be readily sprayable. The data also shows that this is attributed to the thixotrope component of the gel composition.

Example 3: Determining Required Coverage

Gel composition 3 of Example 1, containing 2 wt. % calcium lignosulfonate as a char expansion promoter, was applied onto small wood panels with a syringe to cover half of the surface area (including the edges).

Coverage studies were carried out with approximately 0 (i.e., uncoated control), 200, 400 and 600 mL/m$^2$ of gel composition and dried at 70° C. for 19.5 h. Tests were performed in triplicate. The samples were weighed to determine the initial weight of each sample prior to testing.

The prepared samples were positioned upright, and a butane torch flame (medium intensity) was applied perpendicularly towards the centre of the samples for 30 seconds, after which the torch was removed. Flame on the sample, if ignited, was allowed to self-extinguish in 10 seconds, beyond which the flame was blown out. The burnt samples were weighed to determine the final weight of each, which was then used for calculating the weight loss attributed to burning and the results are collected in Table 3.

Table 3. Summary of weight loss results with varying coverage of the gel composition. *C-1 was burnt completely during a trial run, so no weight loss was determined.

TABLE 3

| Sample | Control | | | 200 ml/m$^2$ | | | 400 ml/m$^2$ | | | 600 ml/m$^2$ | | |
|---|---|---|---|---|---|---|---|---|---|---|---|---|
| Code | *C-1 | C-2 | C-3 | 1-1 | 1-2 | 1-3 | 2-1 | 2-2 | 2-3 | 3-1 | 3-2 | 3-3 |
| Covered area, cm$^2$ | 52.6 | 52.1 | 55.7 | 52.3 | 50.1 | 49.0 | 49.0 | 47.8 | 49.0 | 49.0 | 47.8 | 49.0 |
| Gel composition applied, g | 0 | 0 | 0 | 1.11 | 1.10 | 1.14 | 2.11 | 2.10 | 2.14 | 3.23 | 3.24 | 3.22 |
| Volume applied, mL | 0 | 0 | 0 | 1.00 | 1.00 | 1.00 | 2.00 | 2.00 | 2.00 | 3.00 | 3.00 | 3.00 |
| Mass of gel composition/ area, g/m$^2$ | N/A | N/A | N/A | 212.5 | 220.0 | 232.8 | 430.9 | 439.8 | 436.0 | 659.7 | 677.1 | 657.9 |
| Volume of gel composition/ area, mL/m$^2$ | N/A | N/A | N/A | 191.1 | 199.6 | 204.2 | 408.5 | 418.1 | 408.5 | 612.8 | 627.1 | 612.8 |
| Weight, dried, g | 19.80 | 19.92 | 20.69 | 18.50 | 18.24 | 17.68 | 18.646 | 17.32 | 18.093 | 18.25 | 17.87 | 18.20 |
| Weight, burnt, g | N/A | 18.23 | 18.84 | 17.85 | 17.53 | 16.82 | 18.312 | 16.84 | 17.687 | 17.85 | 17.48 | 17.87 |
| Weight loss, g | N/A | 1.70 | 1.85 | 0.66 | 0.71 | 0.86 | 0.33 | 0.48 | 0.41 | 0.40 | 0.39 | 0.33 |
| Weight loss, % | N/A | 8.5% | 8.9% | 3.5% | 3.9% | 4.9% | 1.8% | 2.8% | 2.2% | 2.2% | 2.2% | 1.8% |

Table 3 shows that a substrate coated with a gel composition of the present disclosure considerably reduces weight loss from fire compared to an uncoated substrate, with a coverage of as low as 200 mL/m$^2$ providing good fire protection.

Example 4: Char Expansion Promoter

Gel composition fire retardant performance was improved through the addition of char expansion promoters such as lignosulfonates (LS) or lignin.

Char expansion of the gel was more profound when LS was present, which improved the overall flame retardant performance. Similar chemicals, such as tannic acid and lignin, were also studied as char expansion promoters. Lignin was found to further improve performance.

Panels coated with the gel compositions containing no char expansion promoter served as the control samples. Those coated with lignosulfonate- and lignin-incorporated gels were denoted as LS-X % and L-X %, respectively, where X indicates the loading of the additive (in wt. %) in the gel used (e.g., LS-1%, L-2%, etc.).

Panels coated with gel compositions containing no fire retardant (no nitrogen-containing blowing agent and no phosphorus-containing acid) but with the char expansion promoter incorporated were also prepared.

Figure 2:
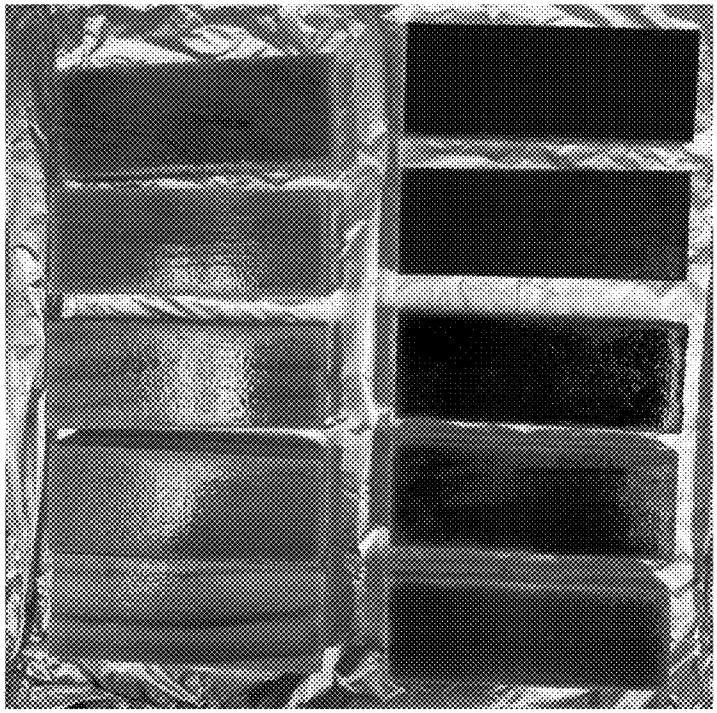
FIG. 2. Digital photograph of panels coated with intumescent gels of different lignosulfonate (left) or lignin (right) loadings.
Figure 3:
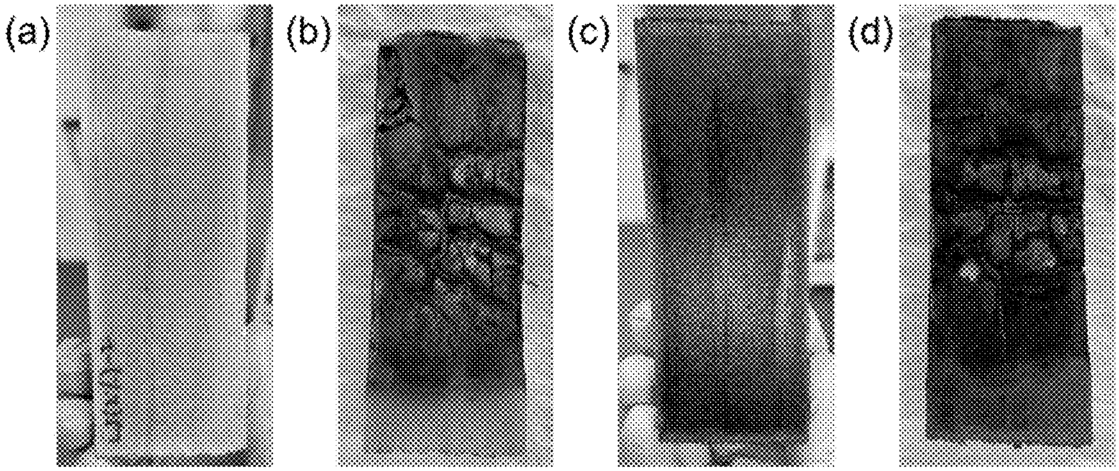
FIG. 3. Digital photographs taken before and after a preliminary fire test of panels coated with gels containing no fire retardant but with (a and b) 2 wt. % lignosulfonate and (c and d) 3 wt. % lignin.

The gels spread across the wood panel readily, unaffected by the smoothness of the surface. After drying at 70° C. overnight, a glossy, sticky coating remained (FIG. 2). Panels coated with gels containing no fire retardant but with the char expansion promoter incorporated showed no gloss (FIGS. 3*a* and *c*). It was observed that the gloss gradually faded out as the lignin content was increased to 2 wt. % and above, but the coatings still appeared moist with the fire retardant present.

Figure 4:
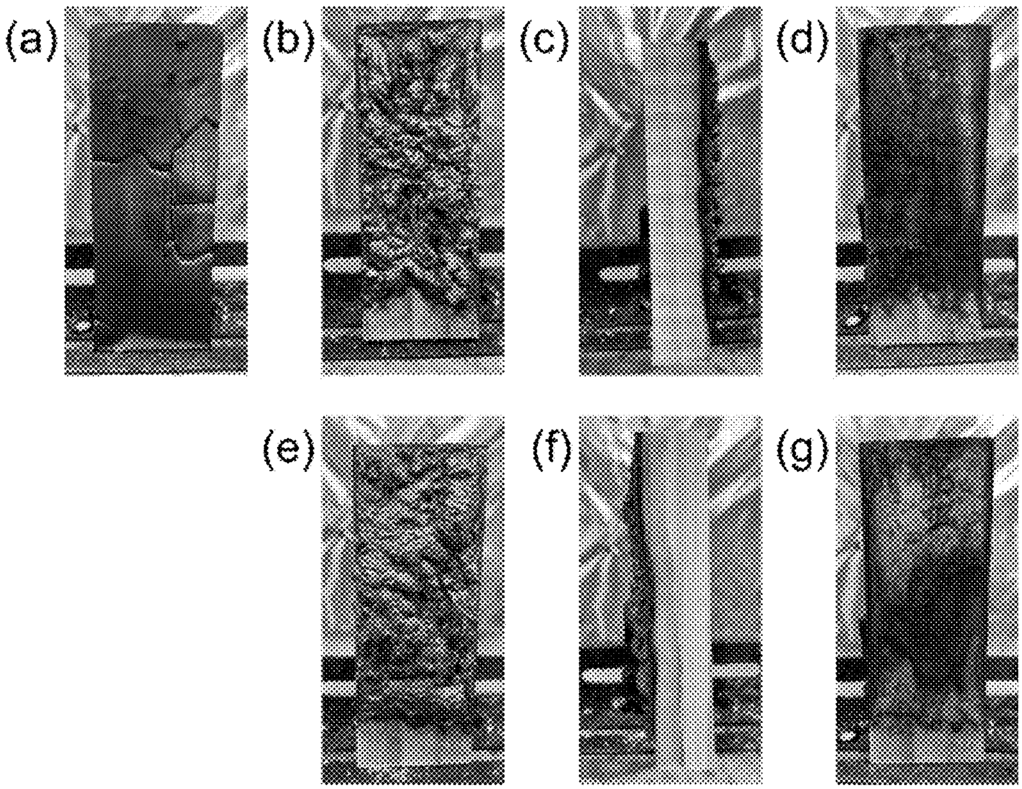
FIG. 4. Digital photographs of (a) uncoated panel, (b-d) the control, and (e-g) LS-2% after a preliminary fire test, (c) and (f) shows the side view of the panel, while (d) and (g) shows the char-removed surface.

Preliminary fire test results using the method as described in Example 3 show that uncoated panels sustained severe fire damage (FIG. 4). The exposed surface was substantially carbonised, and the thermal stress resulted in cracking, which compromised the integrity of the panel. The flame flare also reached around the side of the panel and burnt the non-directly exposed surface. This also occurred with the panels coated with gel compositions containing only the char expansion promoters (FIGS. 3*b* and *d*), indicating that lignosulfonate and lignin did not provide any fire protection when used alone.

For samples containing only fire retardant (FIG. 4 *b-d*), a char layer formed and expanded immediately upon exposure to the butane torch flame. It served as a thermal barrier which (i) prevented further fire damage to the exposed surface and (ii) deflected the flame so its flare could not reach around the side. A blackened surface was revealed after the char layer was removed. However, little to no cracking was observed, indicating that the integrity of the panel was preserved and demonstrating that the fire retardant alone could generate a protective char layer.

Addition of calcium lignosulfonate (FIG. 4 *e-g*) resulted in a more profound char layer and the protected surface underneath showed a much lower extent of blackening. No cracking was observed and the panel was able to retain much of its original form. Similar effects were observed from panels coated with the lignin-incorporated gels. The preliminary fire test indicated that the incorporation of lignosulfonate and lignin as additives for the gel composition could further improve its fire protection performance.

Example 5: Fire Testing at 35 kW/m$^2$

The effectiveness of the char expansion promoter and the influence of loading was assessed using cone calorimetry. These were compared to uncoated wood and a control coated with the gel composition absent the char expansion promoter. Cone calorimetry simulates heat flux that a test sample may experience during real-world situations (e.g., bushfire events), which generates valuable quantitative data that reflects the performance of the formulated gel compositions for their intended application.

Quantitative metrics of particular interest include time to ignition (TTI), heat release rate (HRR), peak HRR (PHRR), peak smoke production rate (PSPR), total smoke release (TSR), carbon dioxide production ($CO_2P$), peak $CO_2P$ ($PCO_2P$), carbon monoxide production (COP), and peak COP (PCOP). The fire performance index (i.e., ratio of TTI to PHRR) was also determined as a metric to compare the performance of the individual gel compositions. The results are collected in Table 4.

A specific incident heat flux of 35 $kW/m^2$ was chosen for the first set of experiments, which simulated a radiant heat level experience in between BAL 29 and BAL 40.

Table 4. Cone calorimeter results of coated and uncoated timber samples collected at 35 $kW/m^2$. [a]Determined when HRR>10 $kW/m^2$, [b]Sample did not ignite so FPI could not be determined.

TABLE 4

| Sample | TTI[a] (s) | PHRR ($kW/m^2$) | THR ($MJ/m^2$) | FPI ($s \cdot m^2/kW$) | PSPR ($m^2/s$) | TSR ($m^2/m^2$) | PCO2P (g/s) | PCOP (g/s) | Residue (wt. %) |
|---|---|---|---|---|---|---|---|---|---|
| Uncoated | 111 | 182 | 45.6 | 0.61 | 0.012 | 77.6 | 0.131 | 0.001 | 66 |
| Control | 571 | 100 | 0.9 | 5.71 | 0.010 | 159 | 0.020 | 0.002 | 81 |
| LS-1% | 410 | 88 | 4.5 | 4.66 | 0.009 | 29 | 0.047 | 0.001 | 83 |
| LS-2% | 565 | 28 | 0.7 | 20.17 | 0.003 | 42 | 0.019 | 0.002 | 86 |
| LS-3% | 442 | 97 | 9.8 | 4.56 | 0.009 | 100 | 0.084 | 0.002 | 78 |
| LS-5% | 242 | 150 | 24.5 | 1.61 | 0.015 | 161 | 0.124 | 0.002 | 68 |
| L-1% | 516 | 17 | 1.7 | 30.35 | 0.014 | 18 | 0.017 | 0.001 | 89 |
| L-2% | 549 | 15 | 0.8 | 36.6 | 0.009 | 11 | 0.016 | 0.002 | 90 |
| L-3% | N/A | 2 | 0.5 | N/Ab | 0.016 | 21 | 0.003 | 0.002 | 90 |
| L-5% | N/A | 2 | 0.6 | N/Ab | 0.013 | 34 | 0.003 | 0.001 | 90 |

For lignosulfonate-incorporated gel compositions, TTI was significantly delayed (>200 s) by coating the wood panel, while the uncoated panel was ignited in 111 s. All coated panels showed suppressed HRR (FIG. 5*a*), lowered PHRR and reduced THR compared to the uncoated panel.

Beside fire protection performance, ability to minimise smoke emission is also a key performance metric to be evaluated for the fire retardant gel compositions, since the inhalation of asphyxiant gases, e.g., carbon dioxide ($CO_2$) and carbon monoxide (CO), is a major contributing factor to death during fire incidents.

Figure 5:
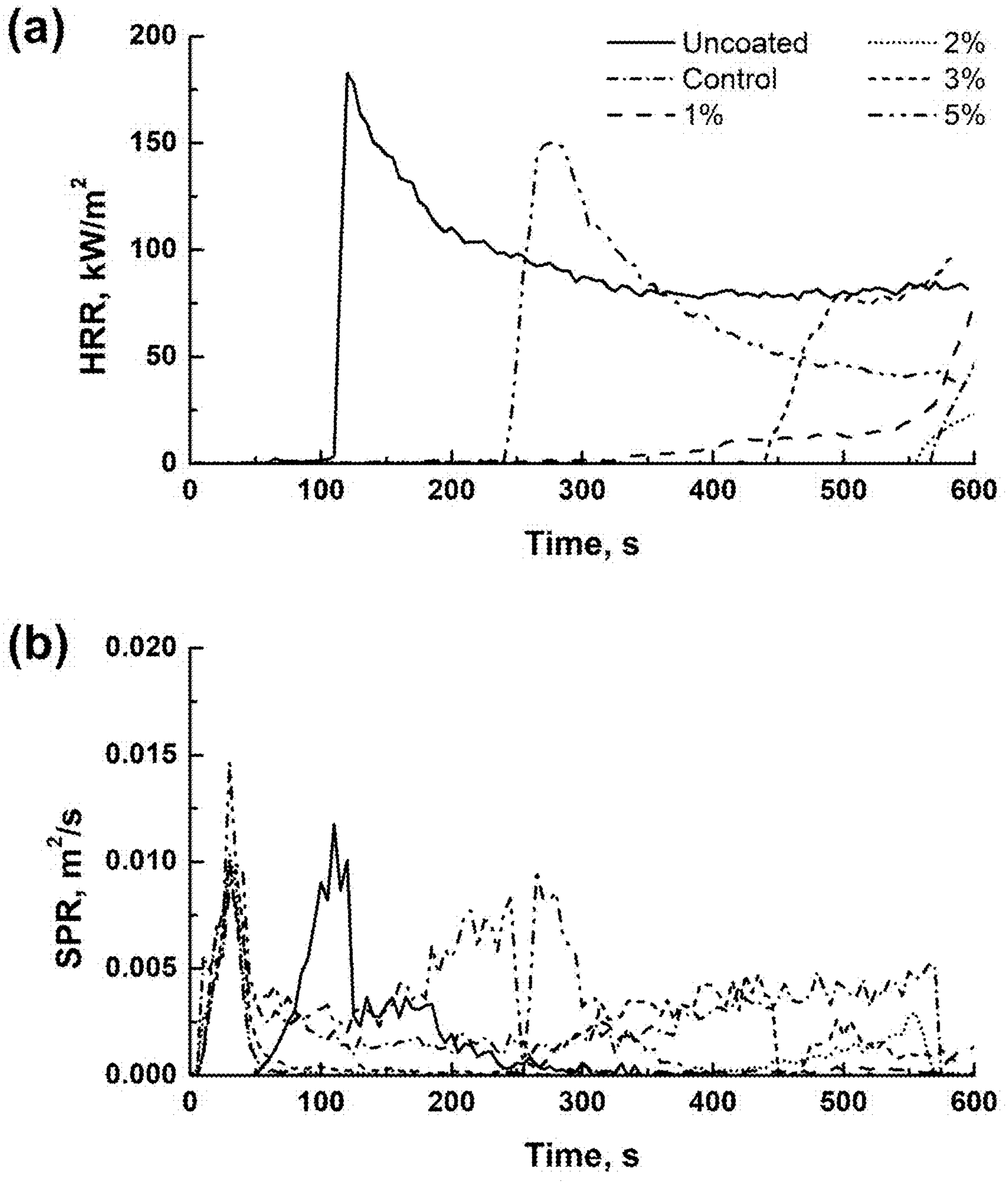
FIG. 5. Plots of (a) heat release rate (HRR), and (b) smoke production rate (SPR) obtained from cone calorimetry experiments at 35 kW/m$^2$ for wood samples coated with lignosulfonate-incorporated intumescent gel.

All coated panels exhibited an initial spike in SPR at 30 s despite there being no ignition (FIG. 5 *b*). There was a duration of gradual increase in SPR for the coated panels between the initial spike and the respective TTI. The duration was the longest for the control. The SPR of all coated panels dropped to zero momentarily after ignition, except for LS-1% as it did not have a sharp ignition. Such behaviour was not observed from the uncoated panel.

According to the TSR results the control generated a higher amount of smoke compared to the uncoated panel even though it provided good fire protection. Panels with fire retardant compositions with lignosulfonate char expansion promoter showed a degree of TSR reduction, particularly for the better performing compositions.

All samples coated with fire retardant gel compositions were able to achieve lower $PCO_2P$, particularly for the better performing compositions.

All coated panels showed similar PCOP (Table 4) compared to the control and uncoated panels. Therefore, there is not a considerable increase in carbon monoxide released.

Cone calorimetry experiments were also carried out with panels coated with lignin-incorporated gel compositions, and they demonstrated excellent performance in fire protection and smoke suppression.

Figure 6:
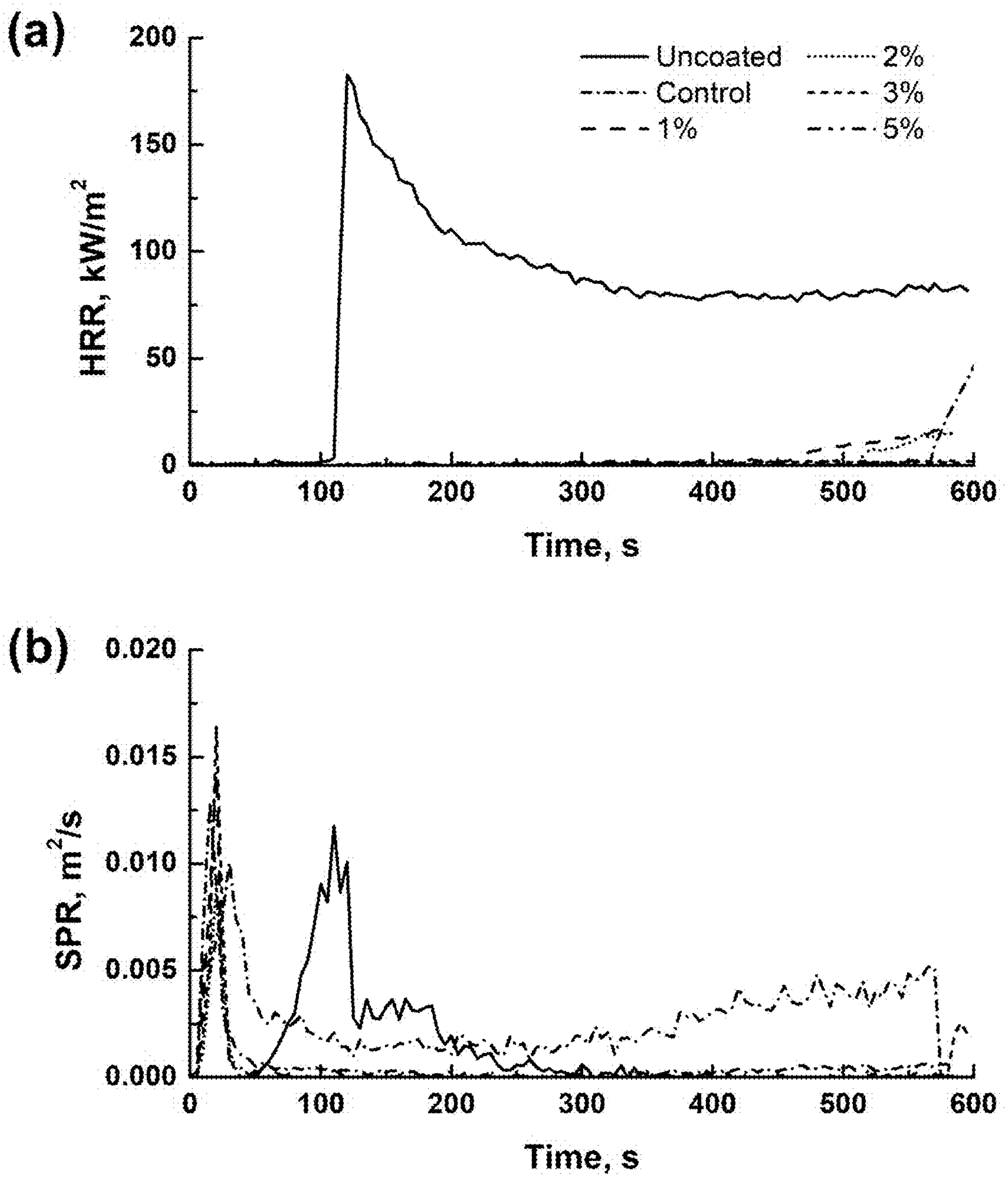
FIG. 6. Plots of (a) heat release rate (HRR), and (b) smoke production rate (SPR) obtained from cone calorimetry experiments at 35 kW/m$^2$ for wood samples coated with lignin-incorporated intumescent gel.

As illustrated in FIG. 6 *a*, all lignin-incorporated gel compositions show a much delayed TTI (>500 s) compared to the uncoated panels. Samples exhibited suppressed HRR and lower PHRR. As a result, L-1% and L-2% have higher FPI (i.e., 30.35 and 36.6 $s \cdot m^2/kW$, respectively) compared to the uncoated and control samples while that of L-3% and L-5% could not be determined since they were not ignited (Table 4).

In terms of smoke production, the initial spike attributed to residual moisture was also observed from panels coated with lignin-incorporated gel compositions (FIG. 6 *b*). The majority of the samples showing higher PSPR than the control and the uncoated panels. The SPR of the gel composition was significantly suppressed by the incorporation of lignin.

Overall, all samples coated with lignin-incorporated gel compositions achieved a TSR well below that of the uncoated panel and the control (Table 4).

For samples coated with the lignin-incorporated gel compositions, $PCO_2P$ values are at the lower end amongst all tested sample and on par with LS-2%. There was little to no $CO_2$ released from the non-ignited samples (Table 4).

There was insignificant difference in PCOP between the lignin-incorporated gel compositions and other tested samples.

Figure 7:
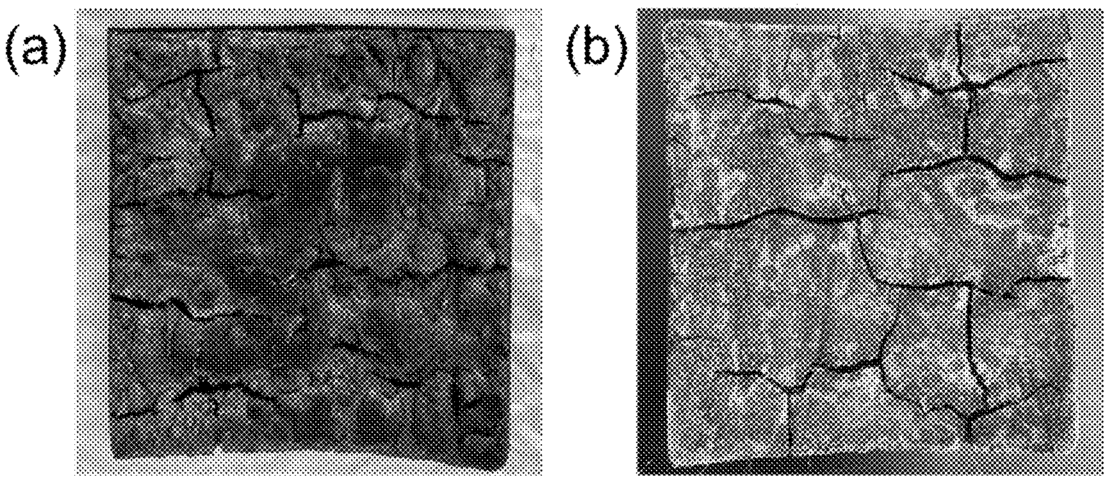
FIG. 7. Digital photographs of (a) control sample retrieved after cone calorimetry performed at an incident heat flux of 35 kW/m$^2$, and (b) with char layer removed.

Remnants of the panels from cone calorimetry performed at 35 $kW/m^2$ were retrieved and examined to understand more about the differences in fire protection performance. As shown in FIG. 7 *a*, an adequate char layer formed across the coated surface for the control. However, cracks were fully revealed after the char layer was removed (FIG. 7 *b*), indicating that the panel has experienced high thermal stress during the experiment.

Figure 8:
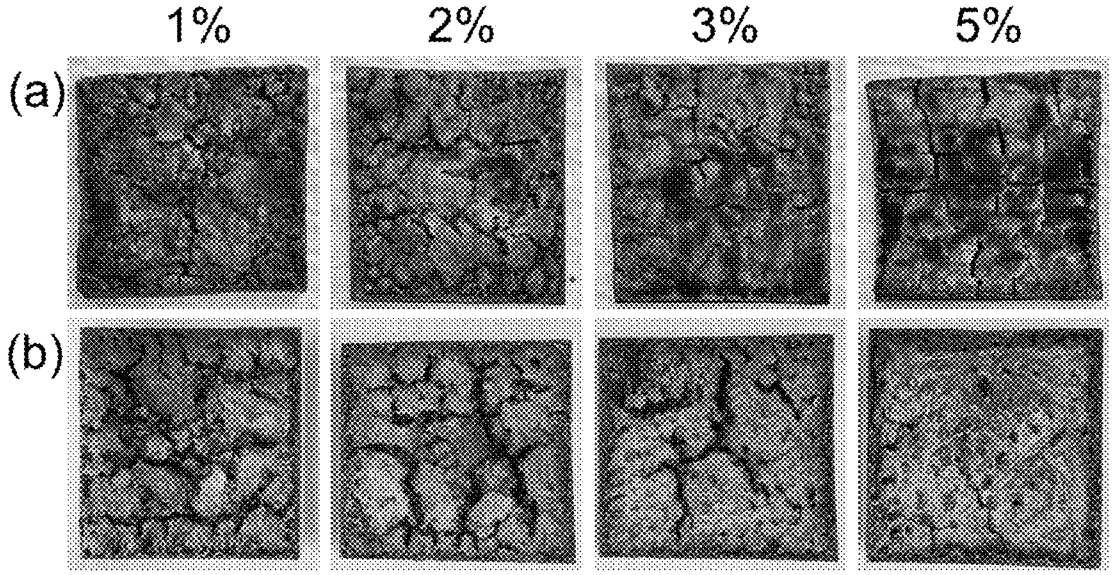
FIG. 8. Digital photographs of coated wood panels retrieved after cone calorimetry performed at an incident heat flux of 35 kW/m$^2$. The panels were coated with (a) lignosulfonate- and (b) lignin-incorporated gels with different loading of the respective performance additives.
Figure 9:
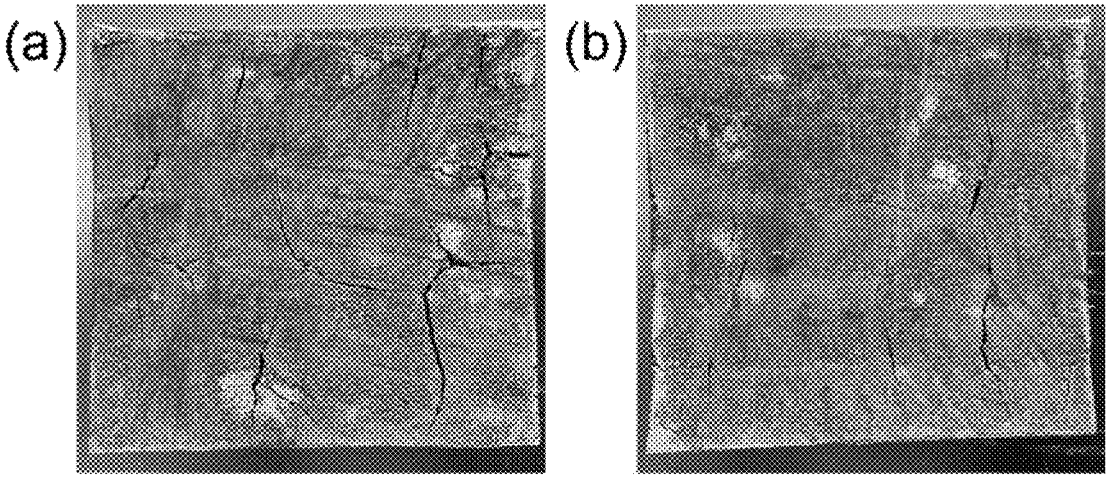
FIG. 9. Digital photographs of (a) LS-1%, and (b) LS-2%, retrieved after cone calorimetry performed at an incident heat flux of 35 kW/m$^2$ with char layer removed.

Char expansion is substantially improved for the lignosulfonate gel compositions, with greater area covered by well-expanded char (FIG. 8 *a*). After char removal, samples had a more intact surface, showing fewer cracks compared to the control (FIG. 9).

For the lignin-incorporated coatings, char expansion was again more pronounced (FIG. 8 *b*). Effective char expansion was achieved even at a lignin loading as low as 1 wt. %. The char expanded evenly across the entire coated surface, covering the panel with a thick, puffy char layer. Integrity of the char layer appeared to increase with the lignin loading, with almost no defect found on the char lay of L-5%.

Because of the exceptional thermal insulation, the coated panels showed no crack after char removal except for being darkened indicating that structural integrity of the substrate was less compromised.

The char layer from each of the tested panels was collected and analysed with Raman spectroscopy. The peaks of interest occur at 1350 $cm^{-1}$ and 1580 $cm^{-1}$, which are commonly referred as the D band and G band, respectively. The degree of graphitisation is represented by the area ratio between the two bands, i.e., $I_D/I_G$. A carbonaceous material with a low $I_D/I_G$ value would have high degree of graphitisation, and thus expected to have higher thermal resistance or flame retardancy.

Figure 10:
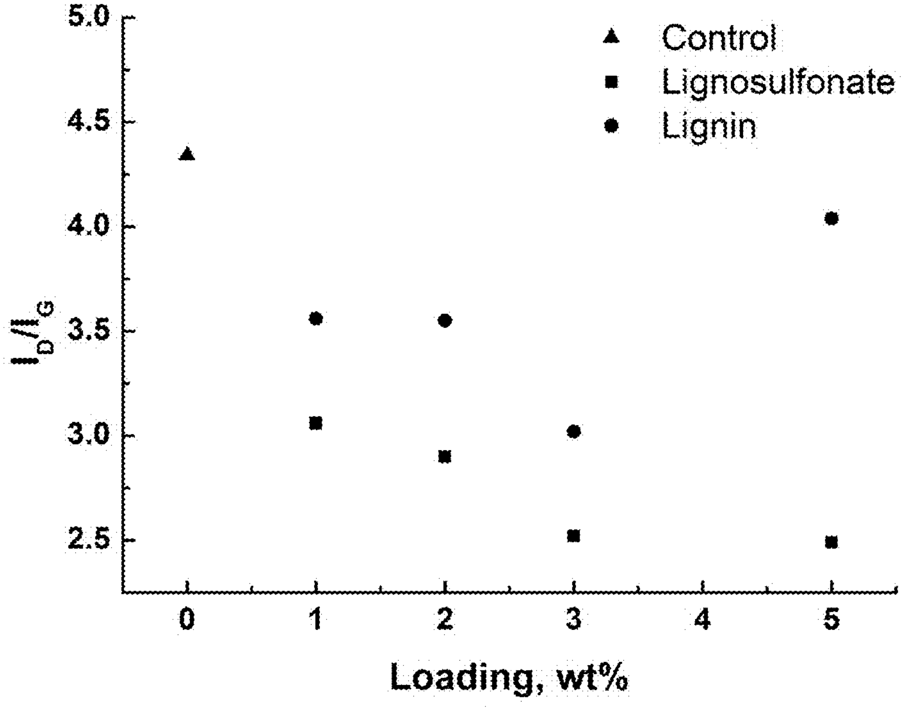
FIG. 10. $I_D/I_G$ value of char layer removed from panel samples retrieved after cone calorimetry performed at an incident heat flux of 35 kW/m$^2$.

As illustrated in FIG. 10 and summarised in Table 5, all samples had $I_D/I_G$ values lower than the control, which demonstrated that the incorporation of lignosulfonate and lignin promotes char formation/graphitisation in all cases. In general, the higher the loading of these performance additives, the higher the degree of graphitisation.

Table 5. $I_D/I_G$ values of char layer removed from panel samples retrieved after cone calorimetry performed at an incident heat flux of 35 kW/m$^2$.

TABLE 5

| | $I_D/I_G$ ratio | |
|---|---|---|
| Loading | Lignosulfonate | Lignin |
| 0 wt. % (i.e., control) | 4.34 | |
| 1 wt. % | 3.06 | 3.56 |
| 2 wt. % | 2.90 | 3.55 |
| 3 wt. % | 2.52 | 3.02 |
| 5 wt. % | 2.49 | 4.04 |

Figure 11:
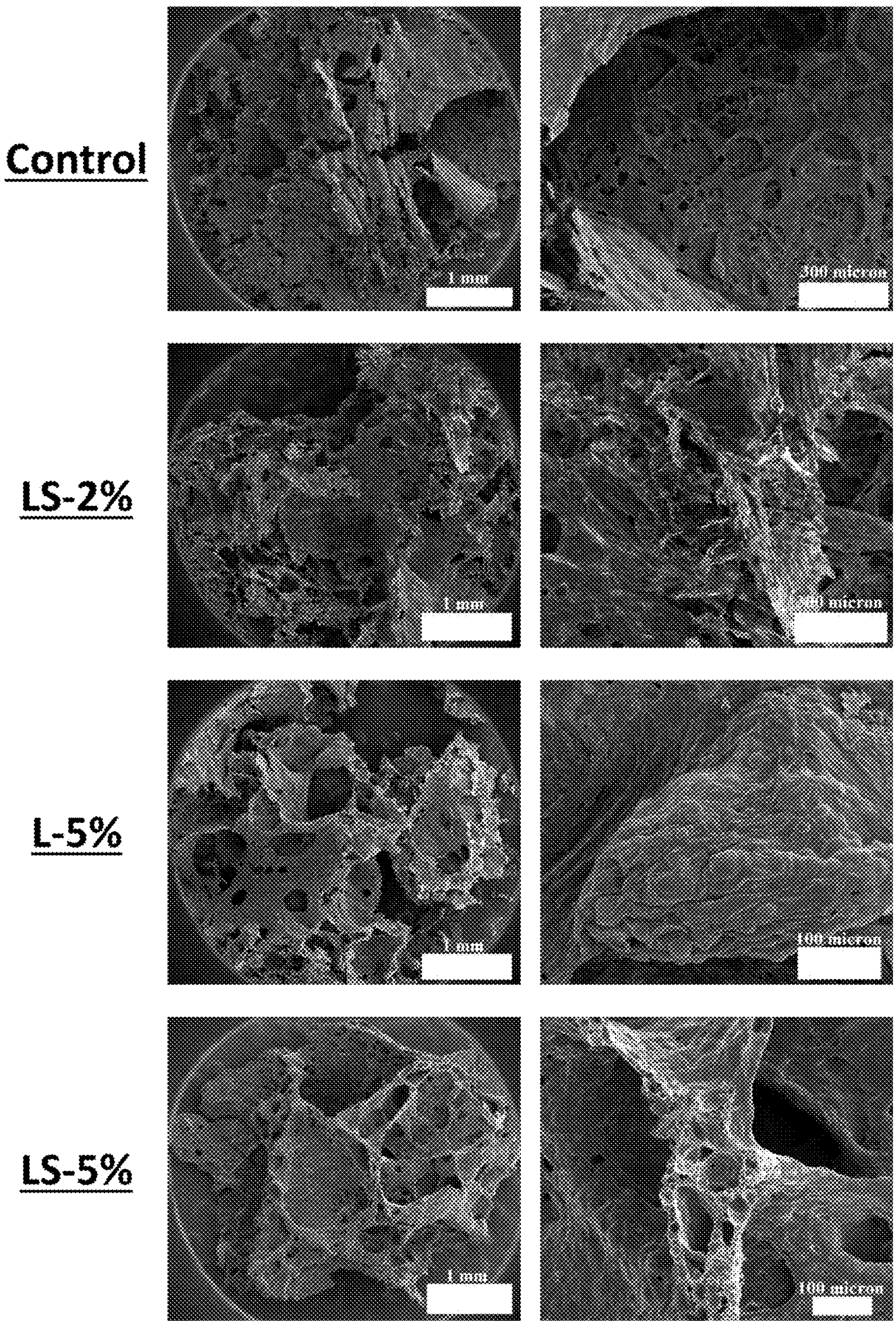
FIG. 11. Scanning electron microscopy images of chars retrieved after cone calorimetry performed at an incident heat flux of 35 kW/m$^2$ from the control and samples treated with LS-2%, L-5% and LS-5%.

The chars collected from the control and samples treated with the LS-2%, LS-5% and L-5% gels were examined by SEM (FIG. 11).

The control sample shows a layered structure. It formed some air pockets but most appear to have collapsed. The chars of LS-2%, LS-5% and L-5% also show layered structures, but they were embedded within an air pocket network. The presence of these pockets likely improved the insulation property of these gels over the control.

Example 6: Fire Testing at 50 kW/m$^2$

Some of the gel compositions were tested by treating timber samples and exposing to a higher heat flux at 50 kW/m$^2$ (i.e., beyond BAL 40) to evaluate their performance at harsher conditions. The results are collected in Table 6. These tests were performed to provide an indication of performance under extreme conditions.

Table 6. Cone calorimeter results of coated and uncoated timber samples collected at 50 kW/m$^2$. $^a$Determined when HRR>10 kW/m$^2$.

TABLE 6

| Sample | TTI$^a$ (s) | PHRR (kW/m$^2$) | THR (MJ/m$^2$) | FPI (s · m$^2$/kW) | PSPR (m$^2$/s) | TSR (m$^2$/m$^2$) | PCO$_2$P (g/s) | PCOP (g/s) | Residue (wt. %) |
|---|---|---|---|---|---|---|---|---|---|
| Uncoated | 11 | 241 | 67.2 | 0.05 | 0.010 | 106 | 0.189 | 0.001 | 41 |
| Control | 37 | 126 | 49.5 | 0.29 | 0.021 | 117 | 0.088 | 0.002 | 50 |
| LS-1% | 293 | 114 | 25.5 | 2.57 | 0.017 | 60 | 0.100 | 0.003 | 65 |
| LS-2% | 377 | 127 | 17.5 | 2.97 | 0.027 | 58 | 0.097 | 0.003 | 72 |
| LS-3% | 101 | 105 | 36.3 | 0.96 | 0.024 | 89 | 0.085 | 0.002 | 57 |
| L-2% | 265 | 145 | 32.8 | 1.83 | 0.016 | 48 | 0.112 | 0.003 | 59 |
| L-3% | 368 | 142 | 23.8 | 2.59 | 0.026 | 57 | 0.090 | 0.004 | 69 |
| L-5% | 346 | 165 | 29.1 | 2.10 | 0.018 | 110 | 0.105 | 0.003 | 64 |

All samples coated with a fire retardant gel composition show an increase in the TTI and substantially lower THR compared to uncoated samples (Table 6). Samples coated in gel compositions containing lignosulfonate char expansion promoter show increased performance when compared to gel compositions with fire retardant only.

The data showed that performance was again improved for all lignosulfonate-incorporated gel compositions compared to the control, with longer TTI, but lower THR and TSR.

Samples coated with a fire retardant gel composition containing lignin char expansion promoter also show an increase in TTI and lower THR (Table 6) when being evaluated at 50 kW/m$^2$.

Even at the higher heat flux, all lignin-incorporated gel compositions performed substantially better than the uncoated and control samples in most aspects.

Figure 12:
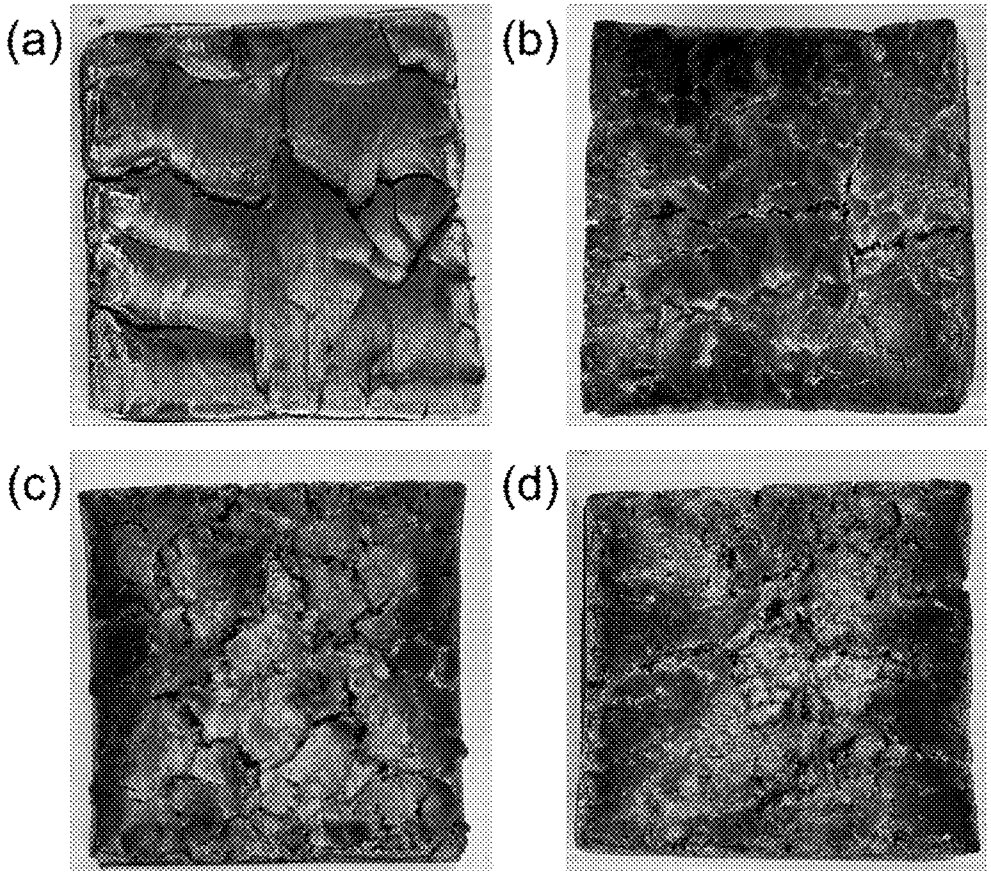
FIG. 12. Digital photographs of (a) uncoated panel, (b) control, (c) LS-2% and (d) L-3% retrieved after cone calorimetry performed at an incident heat flux of 50 kW/m$^2$.

Samples suffered from severe shrinkage and thermal damages at 50 kW/m$^2$ (FIG. 12). However, the results demonstrated that treatment with the gel composition still provides substantial protection to the substrate against fire damage.

Example 7: Influence of Thixotrope

Gel compositions were prepared as in Example 1, but absent thixotrope. Upon exposure of a wood panel coated with the gel composition to a butane torch flame very poor char formation/expansion was observed and structural damage to the wood occurred. Without wishing to be bound by theory it is hypothesised that the thixotrope forms a thin film that assists in trapping gases emitted during thermal degradation of the coating. The trapped gases in turn promote expansion of the coating, which subsequently forms a puffy char upon further degradation, providing excellent insulation against flame.

Example 8: Gel Compositions with Other Thixotropes

Gel compositions were prepared as in Example 1, but with diutan gum as thixotrope. The xanthan gum content was substituted by diutan gum at 0.3 wt %, 0.5 wt %, and 1.0 wt %. It was observed that diutan gum could also trap gases during thermal degradation of the coating. Char expansion did not occur to the same extent as with xanthan gum, however performance was acceptable.

Example 9: Effect of Humectant

When 0.3 g of xanthan gum was pre-dispersed in 2.6 g of glycerol or propylene glycol humectant, both mixtures could be fully dispersed and hydrated in 97.1 g of water in 10 min (stirred at 1380 rpm).

Contrastingly, when mixing 0.3 g of xanthan gum in 99.7 g of water in the absence of humectant, the mixture took about 28 min to be fully dispersed and hydrated (stirred at 1380 rpm). Addition of humectant can effectively shorten the time required for hydration of the thixotrope, which is advantageous to the production of the gel composition.

When using propylene glycol as humectant, the coating appeared substantially drier and had no gloss compared to a coating with glycerol as humectant. Precipitation of the soluble content was observed as the coating dried. Such different behaviour could be attributed to the lower moisture capturing ability of propylene glycol compared to glycerol.

Less moisture was retained after drying at 70° C. overnight, inducing the precipitation of soluble content and loss of gloss.

However, despite this, char with adequate thickness could still be formed with propylene glycol. When a coated wood panel was exposed to a radiant heat flux of 35 $kW/m^2$ for 2 min, no structural damage was observed.

What is claimed is:

1. A fire retardant gel composition comprising:
from 15 wt. % to about 30 wt. % of a nitrogen-containing blowing agent, wherein the nitrogen-containing blowing agent comprises tris (hydroxymethyl)-aminomethane;
from about 1 wt. % to about 15 wt. % of one or more phosphorus-containing acids;
from about 1 wt. % to about 5 wt. % of one or more humectants;
from about 0.1 wt. % to about 1 wt. % of one or more thixotropes;
from about 1 wt. % to about 10 wt. % of one or more char expansion promoters; and
a balance being water to 100 wt. %;
wherein the gel composition expands on heating to form a char layer.

2. The gel composition according to claim 1, wherein the one or more phosphorus-containing acids is polyphosphoric acid.

3. The gel composition according to claim 1, wherein the one or more humectants comprises one or more polyols.

4. The gel composition according to claim 1, wherein the one or more humectants comprises one or more of glycerol, diethylene glycol, propylene glycol, sorbitol, butylene glycol, polyethylene glycol, panthenol, and sodium pyrrolidone carboxylic acid.

5. The gel composition according to claim 1, wherein the one or more char expansion promoters comprises one or more of lignin, tannic acid and a lignosulfonate salt.

6. The gel composition according to claim 1, wherein the one or more char expansion promoters comprises one or more of an alkali metal or alkaline earth lignosulfonate.

7. The gel composition according to claim 1, wherein the one or more thixotropes comprises any one or more of xanthan gum, diutan gum, starch, carboxymethyl cellulose, methyl cellulose, hydroxypropylmethyl cellulose, hydroxyethylcellulose, sclerotium gum, agar, pectin and alginates.

8. A gel composition according to claim 1 comprising:
from 15 wt. % to about 30 wt. % of tris (hydroxymethyl)-aminomethane;
from about 1 wt. % to about 15 wt. % of polyphosphoric acid;
from about 1 wt. % to about 5 wt. % of one or more polyols;
from about 0.1 wt. % to about 1 wt. % of xanthan gum or diutan gum;
from about 1 wt. % to about 10 wt. % of one or more of lignin or lignosulfonate salts; and
the balance being water to 100 wt. %.

9. The gel composition according to claim 8 comprising:
from 15 wt. % to about 30 wt. % of tris (hydroxymethyl)-aminomethane;
from about 1 wt. % to about 15 wt. % of polyphosphoric acid;
from about 1 wt. % to about 5 wt. % of glycerol or propylene glycol;
from about 0.1 wt. % to about 1 wt. % of xanthan gum or diutan gum;
from about 1 wt. % to about 10 wt. % of one or more of lignin or lignosulfonate salts; and
the balance being water to 100 wt. %.

10. The gel composition according to claim 9 comprising:
from 15 wt. % to about 30 wt. % of tris (hydroxymethyl)-aminomethane;
from about 1 wt. % to about 15 wt. % of polyphosphoric acid;
from about 1 wt. % to about 5 wt. % of glycerol or propylene glycol;
from about 0.1 wt. % to about 1 wt. % of xanthan gum or diutan gum;
from about 1 wt. % to about 10 wt. % of one or more of lignin or calcium lignosulfonate; and
the balance being water to 100 wt. %.

11. The gel composition according to claim 10 comprising:
from 15 wt. % to about 20 wt. % of tris (hydroxymethyl)-aminomethane;
from about 3 wt. % to about 8 wt. % of polyphosphoric acid;
from about 2 wt. % to about 4 wt. % of glycerol or propylene glycol;
from about 0.1 wt. % to about 0.5 wt. % of xanthan gum or diutan gum;
from about 1 wt. % to about 10 wt. % of one or more of lignin or calcium lignosulfonate; and
the balance being water to 100 wt. %.

12. The gel composition according to claim 11 comprising:
from 15 wt. % to about 20 wt. % of tris (hydroxymethyl)-aminomethane;
from about 3 wt. % to about 8 wt. % of polyphosphoric acid;
from about 2 wt. % to about 4 wt. % of glycerol or propylene glycol;
from about 0.1 wt. % to about 0.5 wt. % of xanthan gum or diutan gum;
from about 1 wt. % to about 10 wt. % of lignin; and
the balance being water to 100 wt. %.

13. The gel composition according to claim 11 comprising:
from 15 wt. % to about 20 wt. % of tris (hydroxymethyl)-aminomethane;
from about 3 wt. % to about 8 wt. % of polyphosphoric acid;
from about 2 wt. % to about 4 wt. % of glycerol or propylene glycol;
from about 0.1 wt. % to about 0.5 wt. % of xanthan gum or diutan gum;
from about 1 wt. % to about 10 wt. % of calcium lignosulfonate; and
the balance being water to 100 wt. %.

14. The gel composition according to claim 1 further comprising one or more auxiliaries, wherein the auxiliaries include one or more of anticorrosion agents, surfactants, preservatives, and biocides.

15. The gel composition according to claim 1, wherein the gel composition has a viscosity between about 420 mPa/s and 90 mPa/s at 20° C.

16. The gel composition according to claim 1, wherein the gel composition exhibits thixotropic behaviour.

17. A method of protecting a substrate from fire, the method comprising applying the gel composition according to claim 1 to the substrate.

18. The method according to claim 17, wherein the gel composition is applied in an amount from about 100 to about 700 mL/m$^2$.

19. A method of manufacturing the gel composition according to claim 1 comprising the steps of combining the nitrogen-containing blowing agent, the one or more phosphorus-containing acids, the one or more humectants, the one or more thixotropes, the one or more char expansion promoters, and water.

20. The method of manufacturing the gel composition according to claim 19 comprising the steps of:

a) combining the one or more phosphorus-containing acids and the nitrogen-containing blowing agent in water;

b) adding the one or more char expansion promoters;

c) adding the one or more thixotropes and the one or more humectants so as to form the gel composition.

* * * * *